(12) United States Patent
Backa

(10) Patent No.: US 9,239,690 B2
(45) Date of Patent: *Jan. 19, 2016

(54) SYSTEM AND METHOD FOR IN-PLACE DATA MIGRATION

(76) Inventor: Bruce R. Backa, Incline Village, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/212,881

(22) Filed: Aug. 18, 2011

(65) Prior Publication Data

US 2012/0054325 A1 Mar. 1, 2012

Related U.S. Application Data

(60) Provisional application No. 61/378,516, filed on Aug. 31, 2010.

(51) Int. Cl.
*G06F 3/06* (2006.01)

(52) U.S. Cl.
CPC .............. *G06F 3/067* (2013.01); *G06F 3/0604* (2013.01); *G06F 3/0617* (2013.01); *G06F 3/0643* (2013.01); *G06F 3/0647* (2013.01)

(58) Field of Classification Search
CPC . G06F 17/30215; G06F 3/067; G06F 3/0604; G06F 3/0617; G06F 3/0643; G06F 3/0647; H04L 67/02; H04L 67/1098
USPC .......................... 709/203–204, 223; 707/640
See application file for complete search history.

(56) References Cited

U.S. PATENT DOCUMENTS

| 7,275,063 | B2 | 9/2007 | Horn |
| 7,461,092 | B1 | 12/2008 | Sigel et al. |
| 7,783,608 | B2 | 8/2010 | Shitomi |
| 7,783,767 | B2 | 8/2010 | Collazo |
| 8,650,159 | B1* | 2/2014 | Zhang ............... G06F 17/30156 707/664 |
| 8,768,138 | B1* | 7/2014 | Bates ...................... G03B 41/02 386/200 |
| 2002/0046232 | A1 | 4/2002 | Adams et al. |
| 2004/0267832 | A1* | 12/2004 | Wong ................ G06F 17/30067 |
| 2005/0114291 | A1 | 5/2005 | Becker-Szendy et al. |
| 2005/0131871 | A1* | 6/2005 | Howard ............ G06F 17/30067 |
| 2005/0251522 | A1* | 11/2005 | Clark ................ G06F 17/30067 |
| 2006/0101217 | A1* | 5/2006 | Maki ................... G06F 11/2069 711/162 |

(Continued)

OTHER PUBLICATIONS

Microsoft Technet, Overview of Remote BLOB Storage (Sharepoint Server 2010), published May 12, 2010.*

(Continued)

*Primary Examiner* — Uzma Alam
(74) *Attorney, Agent, or Firm* — Davis, Malm & D'Agostine, P.C.

(57) ABSTRACT

Methods and systems for the in-place or post-facto migration of data to a cloud-based data storage service or other virtual storage environment, include a Cloud Storage Import Utility (CSIU) device having a file selection module and configured to generate a user interface. The user interface allows a storage administrator to select one or more files, file folders, or shares to be published to the cloud and optionally migrated from a current storage device to another storage service, and for providing an indication of the selection. The CSIU is configured to capture metadata for the selected files or file folders. The CSIU also provides one or more commands understandable by the cloud-based data storage service, to migrate the metadata to the cloud-based data storage service independently of the files or file folders, so that they are usable by the cloud-based storage service without being moved to the cloud-based storage service.

16 Claims, 15 Drawing Sheets

(56) References Cited

U.S. PATENT DOCUMENTS

| | | |
|---|---|---|
| 2006/0129618 A1 | 6/2006 | Maier |
| 2006/0129627 A1* | 6/2006 | Phillips .................. H04L 63/10 709/200 |
| 2006/0179061 A1 | 8/2006 | D'Souza et al. |
| 2008/0104359 A1 | 5/2008 | Sauer et al. |
| 2008/0104393 A1 | 5/2008 | Glasser et al. |
| 2008/0270451 A1 | 10/2008 | Thomsen et al. |
| 2009/0024671 A1 | 1/2009 | Johnson et al. |
| 2009/0089335 A1 | 4/2009 | Shitomi et al. |
| 2009/0089395 A1* | 4/2009 | Fen ......................... G06F 15/16 709/216 |
| 2009/0217345 A1 | 8/2009 | Backa |
| 2010/0049931 A1 | 2/2010 | Jacobson et al. |
| 2010/0082567 A1* | 4/2010 | Rosenblatt ........ G06F 17/30017 707/705 |
| 2010/0106778 A1* | 4/2010 | Needham et al. ............. 709/204 |
| 2010/0205156 A1 | 8/2010 | Anderson et al. |
| 2010/0325199 A1* | 12/2010 | Park .................. G06F 17/30067 709/203 |
| 2010/0325422 A1* | 12/2010 | Gnanasambandam et al. ................. G06F 17/30082 713/153 |
| 2010/0332401 A1* | 12/2010 | Prahlad ............... G06F 17/3002 705/80 |
| 2010/0332593 A1* | 12/2010 | Barash .................. H04L 63/145 709/203 |
| 2010/0333116 A1 | 12/2010 | Prahlad et al. |
| 2011/0161723 A1* | 6/2011 | Taleck ............. G06F 17/30156 714/4.11 |
| 2011/0167435 A1* | 7/2011 | Fang ............................. 719/329 |
| 2011/0271067 A1* | 11/2011 | Chou et al. ..................... 711/162 |
| 2011/0320469 A1* | 12/2011 | Canessa ............. G06F 17/3028 707/758 |
| 2012/0005252 A1* | 1/2012 | Canessa ............. G06F 17/3028 709/201 |
| 2013/0024424 A1* | 1/2013 | Prahlad et al. ................ 707/640 |

OTHER PUBLICATIONS

Baru, Chaitanya, Regan Moore, Arcot Rajasekar, Michael Wan, "The SDSC Storage Resource Broker," Proceedings of the 1998 conference of the Centre for Advanced Studies on Collaborative research, p. 5, Nov. 30-Dec. 3, 1998, Toronto, Ontario, Canada. (pp. 1-12) Uses metadata to record location information for storage resources (PSRs) as well as for data items. (p. 5, section 3.1).

Mesiner, Mike, Gregory R. Ganger, Erik Riedel, "Object-Based Storage," IEEE Communications Magazine, pp. 84-90, Aug. 2003. Object based storage including aspects of NAS and SAN architectures, metadata offloaded to storage device, to be independent from storage application.

* cited by examiner

SYSTEM AND METHOD FOR IN-PLACE DATA MIGRATION

RELATED APPLICATION

This application claims the benefit of U.S. Provisional Patent Application Ser. No. 61/378,516, entitled System and Method for In-Place Data Migration, filed on Aug. 31, 2010, the contents of which are incorporated herein by reference in their entirety for all purposes.

TECHNICAL FIELD

The present invention relates to data storage and digital content management and more particularly, to a cost-effective system and method for in-place or post-facto migration of data to cloud-based storage services.

BACKGROUND INFORMATION

It is important for companies to find cost effective ways to manage their digital file storage. Although it may seem that file storage is inexpensive, 80% or more of the total cost of ownership is in managing and administering that storage. Most organizations' need for file storage is growing at 40% to 50% per year, along with the cost to manage that storage. Today, many companies have so much data that moving it from place to place can be cost-prohibitive.

A number of storage software vendors provide solutions that will store and organize data. Examples of such solutions in include conventional NAS, SAN or DAS storage devices which are typically deployed and maintained by an enterprises IT department. In addition, there is currently a trend towards public and private cloud-based or virtual data stores and associated name spaces supported internally and externally, and accessed by users via a Wide Area Network such as the Internet and by legacy protocols such as CIFS and NFS. Examples of these approaches include the Microsoft® SharePoint™, ByCast, and Xanet services, etc.

One of the drawbacks the Storage Industry has today is that, unlike in the past when file data was comparatively small could be easily copied from one location to another, today's enterprises often have too much data to move other than by necessity. This may be particularly problematic for relatively large users attempting to migrate from conventional user-supported NAS, SAN or DAS storage devices, to the aforementioned cloud-based or virtual data stores. Indeed, for an enterprise-class customer that may have several terabytes (or more) of data, such movement may not be realistically feasible, since the resources required for such a data migration may approach or exceed the available resources of their IT infrastructure.

For example, the US military has recently attempted to standardize on SharePoint™. In total there are approximately 3 million users, hundreds of petabytes of data and trillions of files. Currently, it may be possible to load a trillion records into a database. Indeed, in some applications it may be possible to manipulate a billion records using a conventional desktop computer. However, it is impractical, if not substantially impossible, to move 100 petabytes of data electronically from point A to point B in any reasonable period of time or affordable cost.

Accordingly, what is needed is a cost-effective system and method for the virtual, or post-facto migration of relatively large amounts of data to cloud-based data sharing services or other content management systems.

SUMMARY

Aspects of the present invention include methods and systems for the in-place or post-facto migration of data to a cloud-based data storage service or other virtual storage environment. The system includes a Cloud Storage Import Utility (CSIU) device including a file selection module and configured to generate a user interface. The user interface is configured for allowing a storage administrator to select one or more files, file folders, or shares to be to be published to the cloud and optionally migrated from a current storage device to another storage service, and for providing an indication of said selection. The CSIU is configured to capture metadata for the selected files or file folders. The CSIU also provides one or more commands understandable by the cloud-based data storage service, to cause the metadata to be migrated to the cloud-based data storage service independently of the files or file folders, so that they are usable by the cloud-based storage service without being moved to the cloud-based storage service.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

An aspect of the invention was the realization that data storage for large scale, enterprise-level applications presents issues that are substantially different from those of relatively small scale applications. The instant inventor also realized that contrary to conventional wisdom among much of the relevant industry, metadata and the underlying data to which it pertains, may be separated from one another without sacrificing desired functionality.

Figure 1:
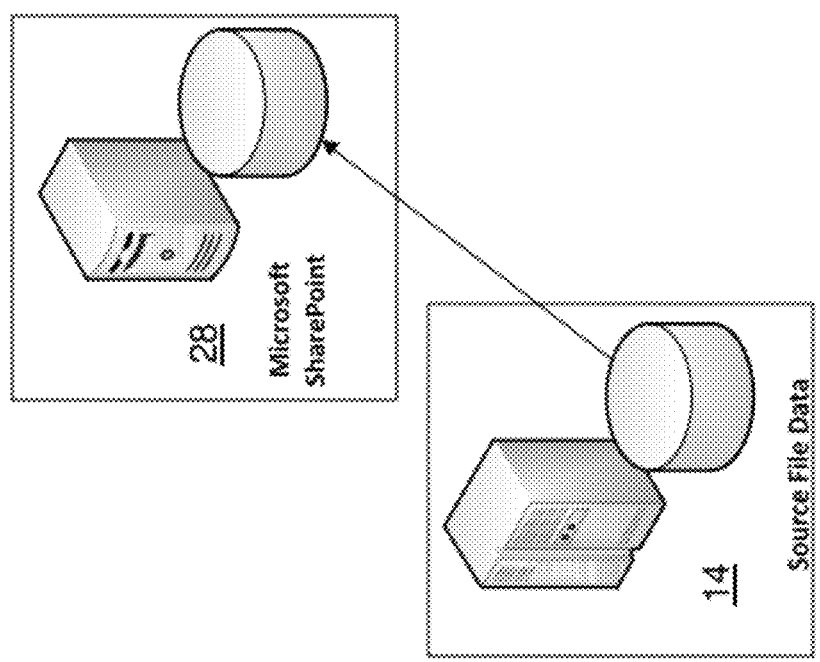
FIGS. 1 and 2 are block diagrams of systems of the prior art.
Figure 2:
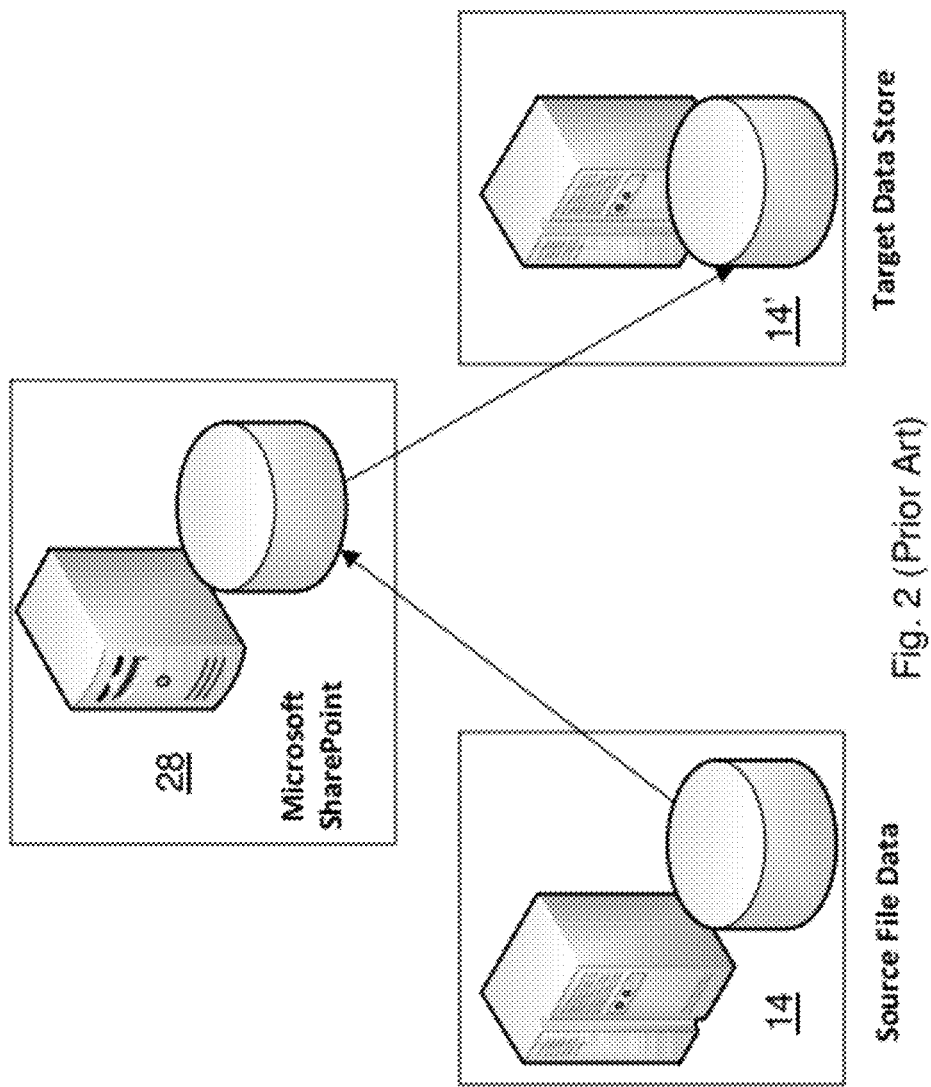

Turning now to FIG. 1, can be seen that in order to use conventional cloud-based data storage services 28, all of the data, i.e., the underlying data bits and their corresponding metadata, must be moved from an original location (e.g., data store 14) into the cloud-based service 28. As shown in FIG. 2, once in service 28, the data may be transferred to a remote data store, such as via Sharepoint's Remote Blob Storage feature, shown at 14', where it may be accessed by service 28. However, both of these scenarios require the initial upload of the underlying data, as well as its corresponding metadata, to service 28.

Figure 3:
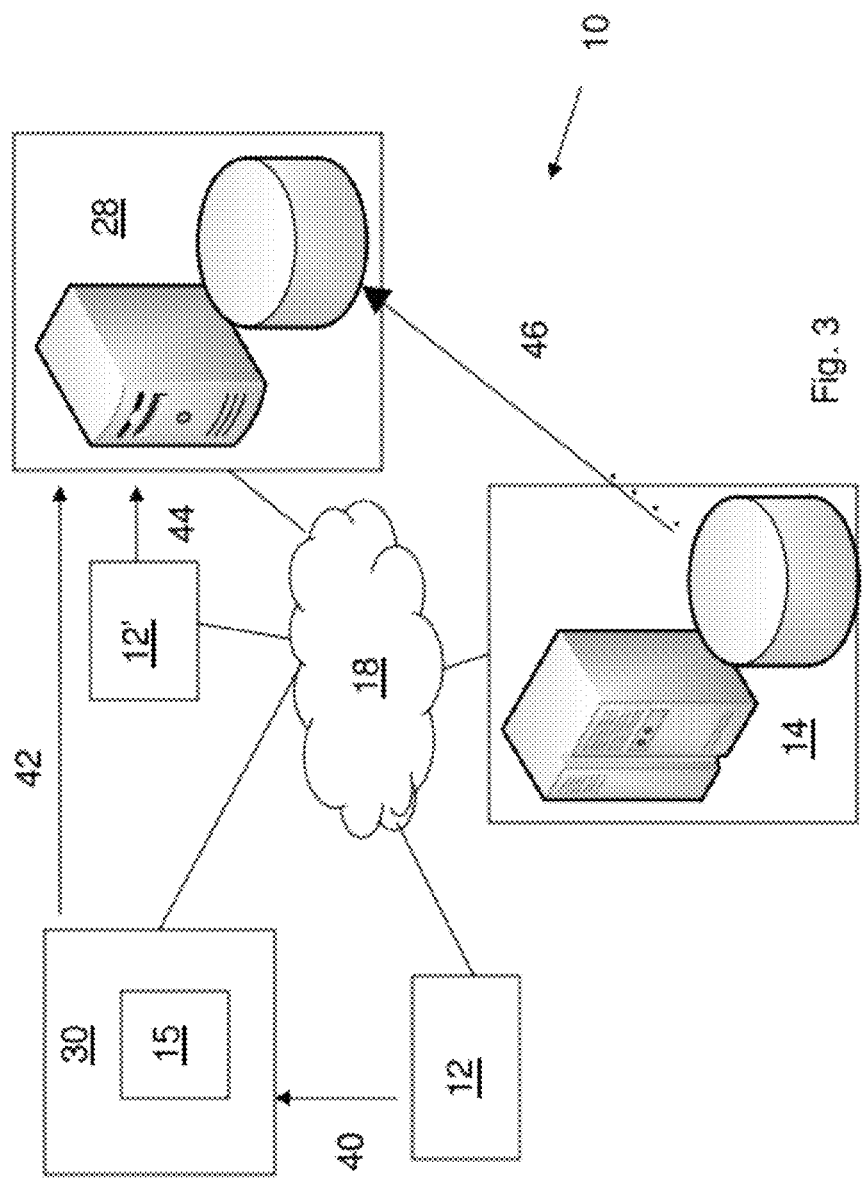
FIG. 3 is a block diagram of an embodiment of a system and method of the present invention.

Turning now to FIG. 3, an embodiment of the present invention will be described in connection with an exemplary system 10. As shown, system 10 may be accessed by a storage administrator, via a user device 12, which may take the form of a computer, laptop, PDA, Smart phone or the like. Other examples of user devices 12 include a workstation, personal computer, personal digital assistant (PDA), wireless telephone, or any other suitable computing device including a processor, a computer readable medium upon which computer readable program code (including instructions and/or data) may be disposed, and a user interface, all of which require or may be used by a storage administrator to migrate data to a cloud-based or virtual data storage service for primary and/or archiving storage. A similar device usable by an end-user, shown as end-user device 12', may be used in a conventional manner to access files administered by embodiments of the present invention.

As shown, the user device 12 is communicably couplable via a network 18, e.g., a Wide Area Network such as the Internet, to a storage device 14 that may be used for primary (day to day) storage, and/or that may also be used for long term storage or archiving. The primary storage and long-term or archiving storage may be performed on two different areas of the same physical storage device 14 or alternatively, may be performed on two physically different and/or remotely located storage devices 14.

Storage device 14 may include any number of storage devices, including, but not limited to, Network Attached Storage (NAS) such as those available from EMC Corporation (Hopkinton, Mass., USA) and NetApp (Sunnyvale, Calif., USA), Storage Area Network (SAN) devices such as, but not limited to, those from EMC Corporation (Hopkinton, Mass., USA), and direct attached storage devices (DAS) such as, but not limited to, devices running the Microsoft Windows Server operating system.

A cloud-based (virtual) data store/storage system 28 is also shown communicably coupled to network 18. This storage system 28 may take the form of any number of commercially available services, such as the aforementioned Microsoft® SharePoint™, ByCast, and Xanet services, etc. For ease of explication, the embodiments disclosed herein will be shown and described with respect to the Microsoft® Sharepoint™ service, with the understanding that these embodiments/descriptions are applicable to substantially any cloud-based or other virtual storage environment data store/storage system currently available or which may be developed in the future.

As also shown, system 10 includes a Cloud Storage Import Utility (CSIU) 30. This CSIU 30 is located on a server (e.g., a webserver) that may enable user access via webpage(s). This server may also perform other functions and may provide various other features to the network such as database hosting, etc. The CSIU 30 enables users, such as storage administrators, to select files, e.g., by accessing a file selection application 15, to select files for in-place-migration from a storage device 14 to a Sharepoint system 28. The CSIU 30 receives file selections from the file selection application 15 and then captures information (e.g., metadata) associated with the selected files. CSIU 30 is configured to then insert this captured metadata into the metadata database of the Sharepoint data store 28. The CSIU 30 may also be configured to index (or to enable communication with Sharepoint enabling it to index) the files selected by file selection application 15, e.g., to enable end-users to effect content-based, full text searching of the selected files via the Sharepoint interface.

It should be recognized that the file selection application 15 may be a software application, such as a version of the NTP Software Storage Investigator™ available from NTP Software (Nashua N.H.) and incorporated herein by reference, that may be modified in accordance with the teachings hereof, to permit users to designate specific files or categories of files for use by CSIU 30. The file selection application 15 may reside directly on the server hosting CSIU 30, or on another server or platform, including, optionally, user device 12. It should also be recognized that storage device 14 may be substantially any data store which is remote from the Sharepoint store 28, including, for example, a data store connected via Sharepoint's Remote Blob Storage, shown as 14' in FIG. 4.

As mentioned hereinabove, user device 12, 12', storage device 14, 14', cloud storage service 28, and the server that holds CSIU 30, are communicably coupled to one another over a network communication path 18, such as the Internet. The user device 12, 12' may be any form of computing or data processing device capable of communicating via network 18.

Terms such as "server", "application", "engine", "module" and the like are each intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The term "cloud-based data storage" will be used herein to refer to substantially any virtual storage environment. The term "in-place migration" and/or "post-facto migration" refers to publishing or otherwise making data usable by the cloud-based storage service without having to first move the data to the cloud-based storage service.

In various embodiments, the CSIU 30 and/or file selection application 15 may provide a user interface that takes any of various forms including, but not limited to, a standard web browser based application that operates with web browsers such as, but not limited to, Microsoft Internet Explorer (IE) and Mozilla Firefox.

The CSIU 30 is an application configured to effectively translate selections made using the File Selection Application 15 e.g., using lookup tables, database, hard coded programming, configuration files or the like, into instructions or commands usable by CSIU 30 as discussed hereinabove. CSIU 30 is also configured to capture information (e.g., metadata) associated with the file selections and effectively package it with these instructions/commands for use by cloud-based service 28. CSIU 30 may also handle appropriate security requirements, e.g., to ensure that the particular user at device 12 has requisite permissions, etc.

In particular embodiments, CSIU 30 may include a version of the NTP Software ODA™ engine commercially available from NTP Software, Inc. (Nashua, N.H., USA) and incorporated herein by reference, and which has been modified in accordance with the teachings hereof.

In a representative method of operating system 10, a user (e.g., storage administrator) may use device 12 to access 40 the file selection application 15 of the CSUI 30 and select files or folders on primary data store 14. The CSIU 30 may then capture information (e.g., metadata) for the selected files and/or folder(s), and translates the intended actions into instructions, including metadata, to be conveyed 42 to the Sharepoint service 28 for incorporation into the Sharepoint metadata file(s), to effect the desired in-place-migration of the selected files/folders. Thereafter, an end-user 12' may query 44 the Sharepoint data store 28, to retrieve 46 data files stored on remote data store 14.

Figure 4:
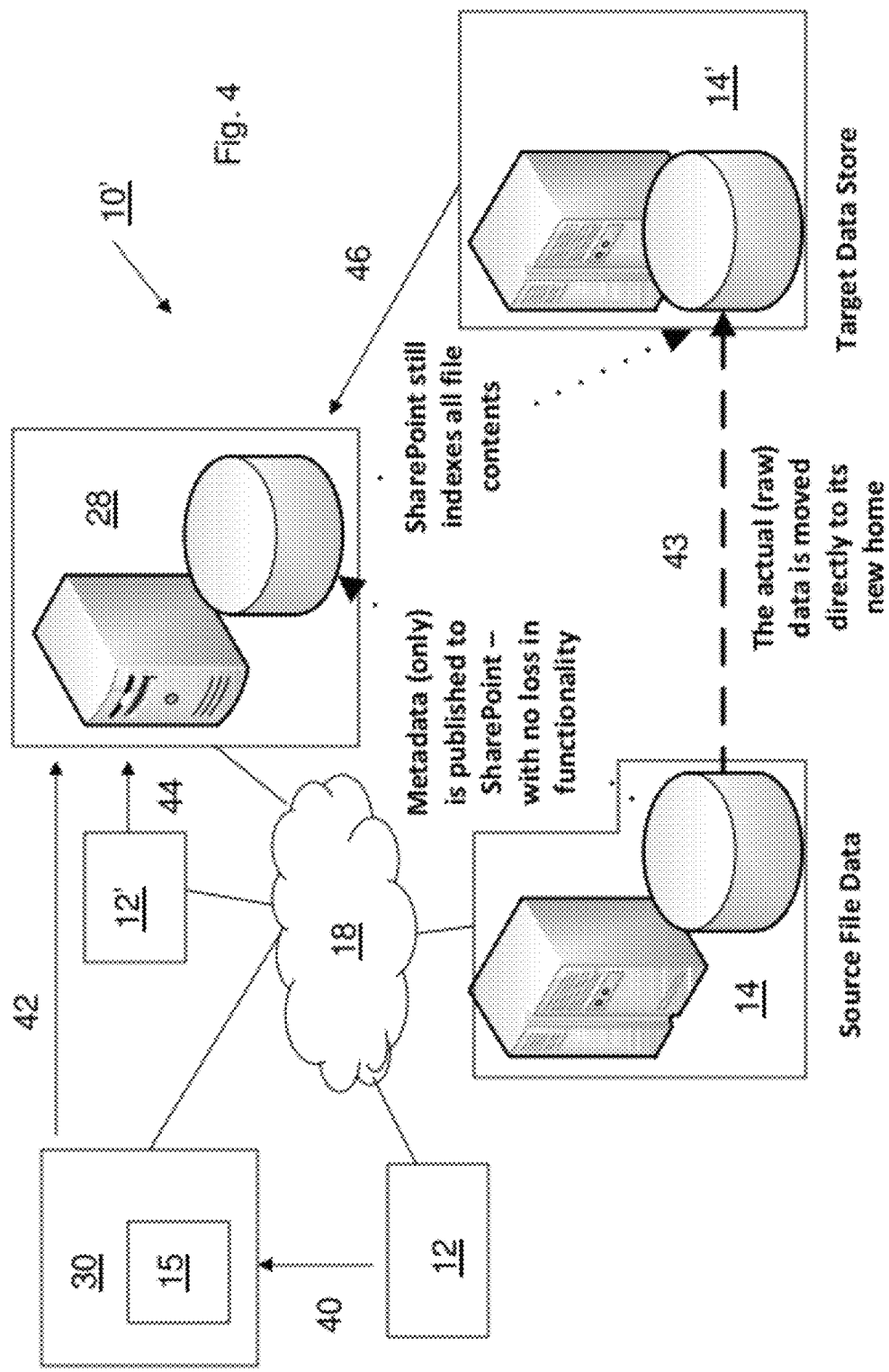
FIG. 4 is a block diagram of an alternate embodiment of a system and method of the present invention.

Turning now to FIG. 4, an alternate embodiment of the present invention is shown as exemplary system 10'. System 10' is substantially similar to system 10 of FIG. 3, while also including another remote data store 14' which may serve as a new repository for the underlying source data for the files/folders selected by the user via device 12. During operation of this system 10', a user (e.g., storage administrator) may use device 12 to access and select 40 files using the file selection application 15 of the CSUI 30. The CSIU 30 may then capture information (e.g., metadata) for the selected files/folder(s), translate the intended actions into instructions, and convey 42 this information, including the metadata, to the Sharepoint service 28. The underlying data may also be moved 43 (e.g., in response to a command sent via device 12) from data store 14 to the other data store 14' (e.g., via Sharepoint Remote Blob Storage), where it may be handled by cloud-based service 28. In this manner, system 10' effects the desired in-place-migration of the files selected by the user, by moving them to target data store 14' where they may be accessed via service 28 without ever having to be moved to the service 28. Thereafter, an end-user 12' may query 44 the Sharepoint data service 28, to retrieve 46 data files stored on remote data store 14'.

Figure 5:
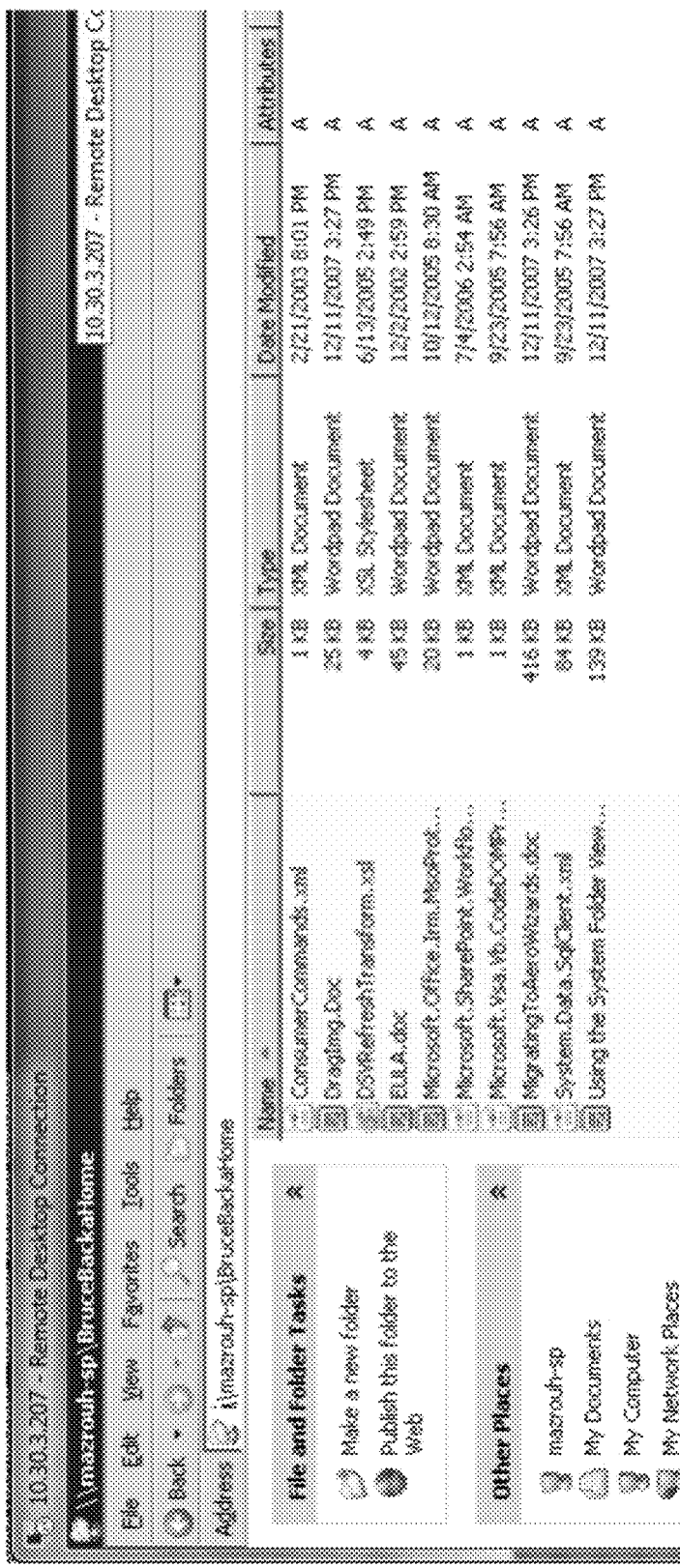
FIGS. 5-15 are screen displays of an exemplary operation of an embodiment of the present invention.

A more detailed example of in-place-migration in accordance with the present invention will now be shown and described with reference to FIGS. 5-15. Turning now to FIG. 5, user device 12 may be used to access a particular end-user's home directory on data store 14. In this example, the entire contents of this home directory will be selected for (in-place) migration into this user's Home Documents site on SharePoint 28.

Figure 6:
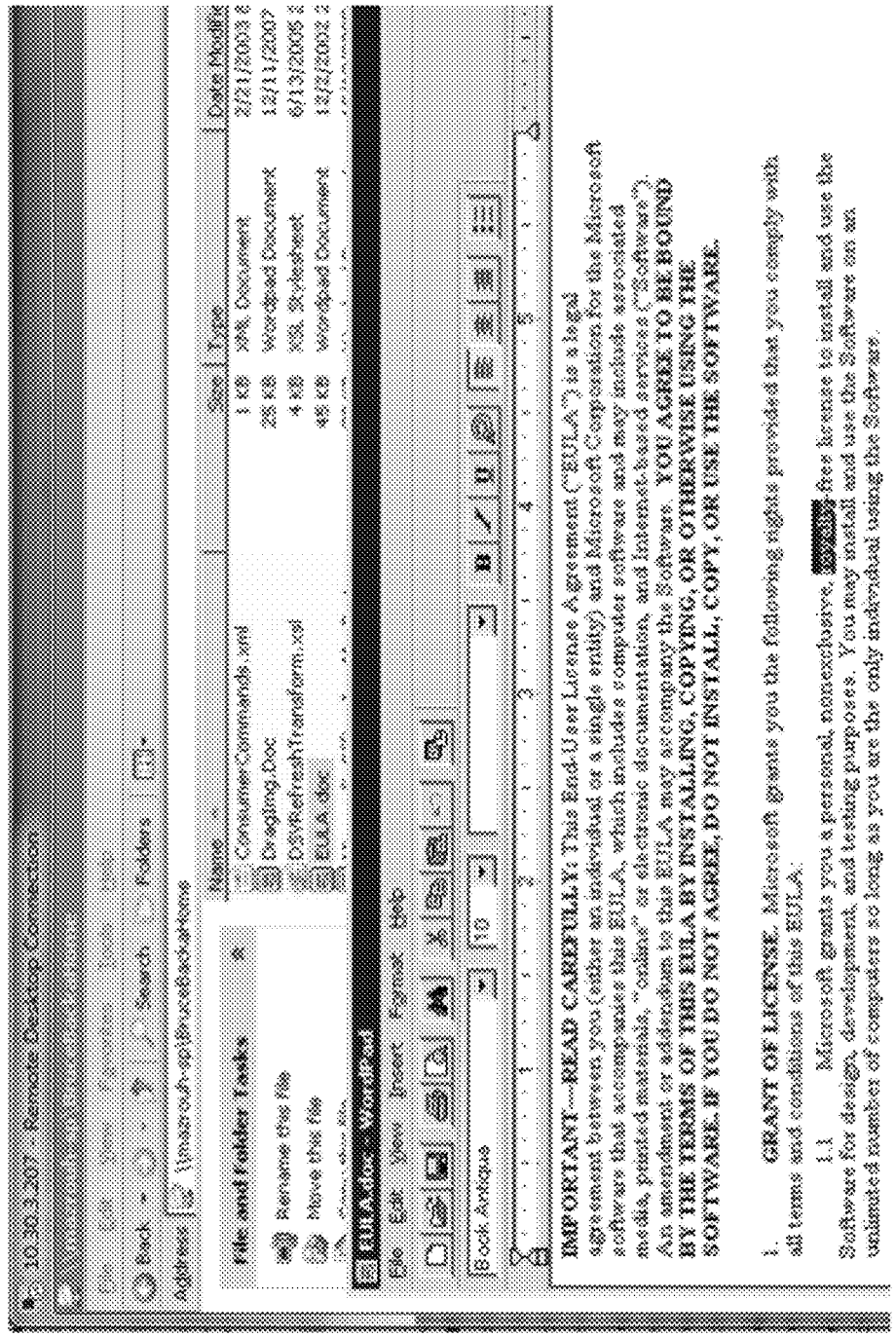

It should be recognized that the data files shown in this home directory on data store 14 are indexed, e.g., by the CSIU 30 using any number of conventional indexing approaches, to enable end-users to search the contents based on keywords. For example, as shown in FIG. 6, the word "royalty" has been used to search for the EULA.doc file. The index(es) of this home directory may thus be imported into service 28 as part of the migration process, and/or the data files may be indexed by service 28 after receiving the metadata, as will be discussed in greater detail hereinbelow.

Figure 7:
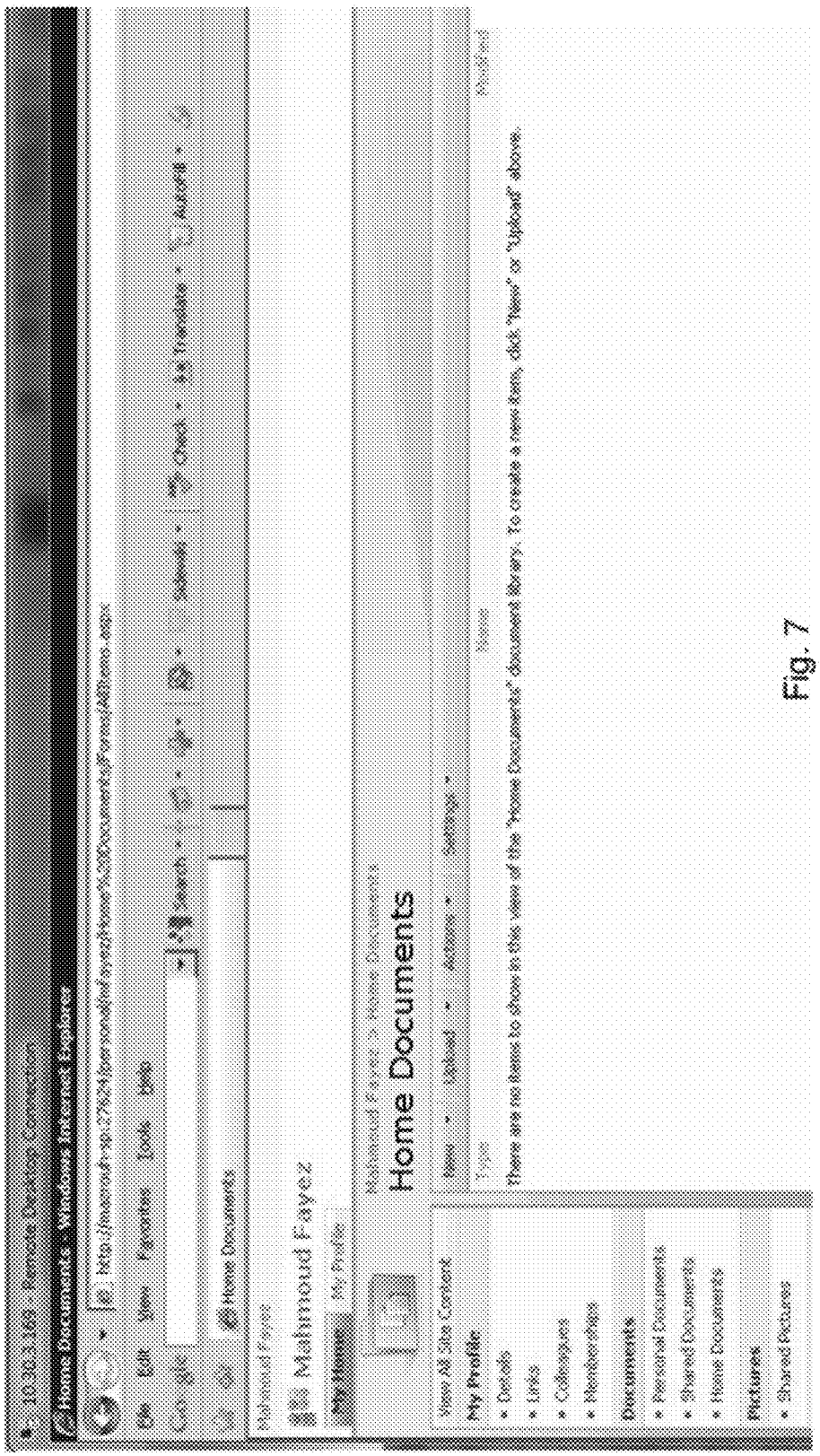

As shown in FIG. 7, in this example, prior to file migration, the contents of the end-user's Home Documents site on Sharepoint 28 is empty.

Figure 8:
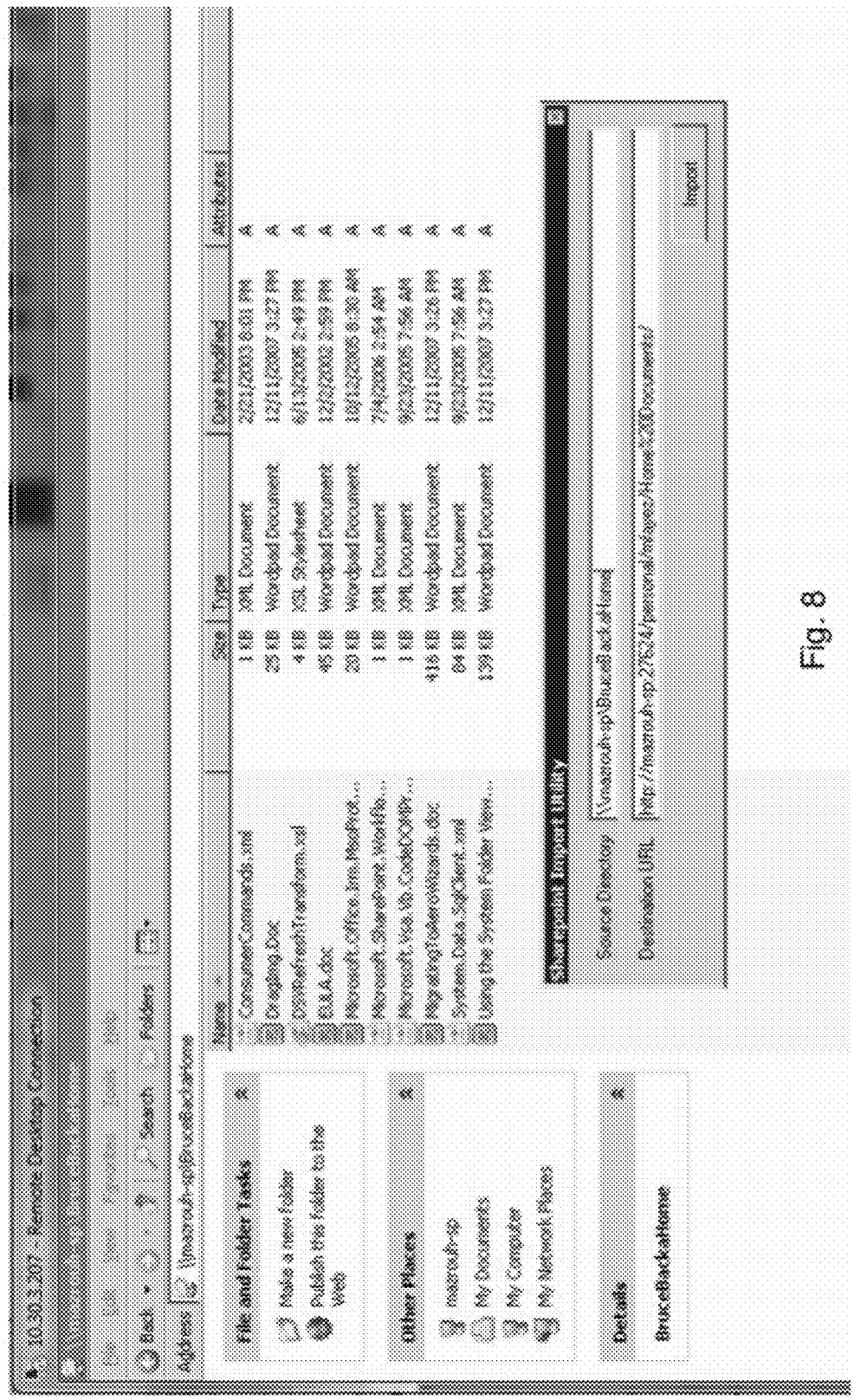
Figure 9:
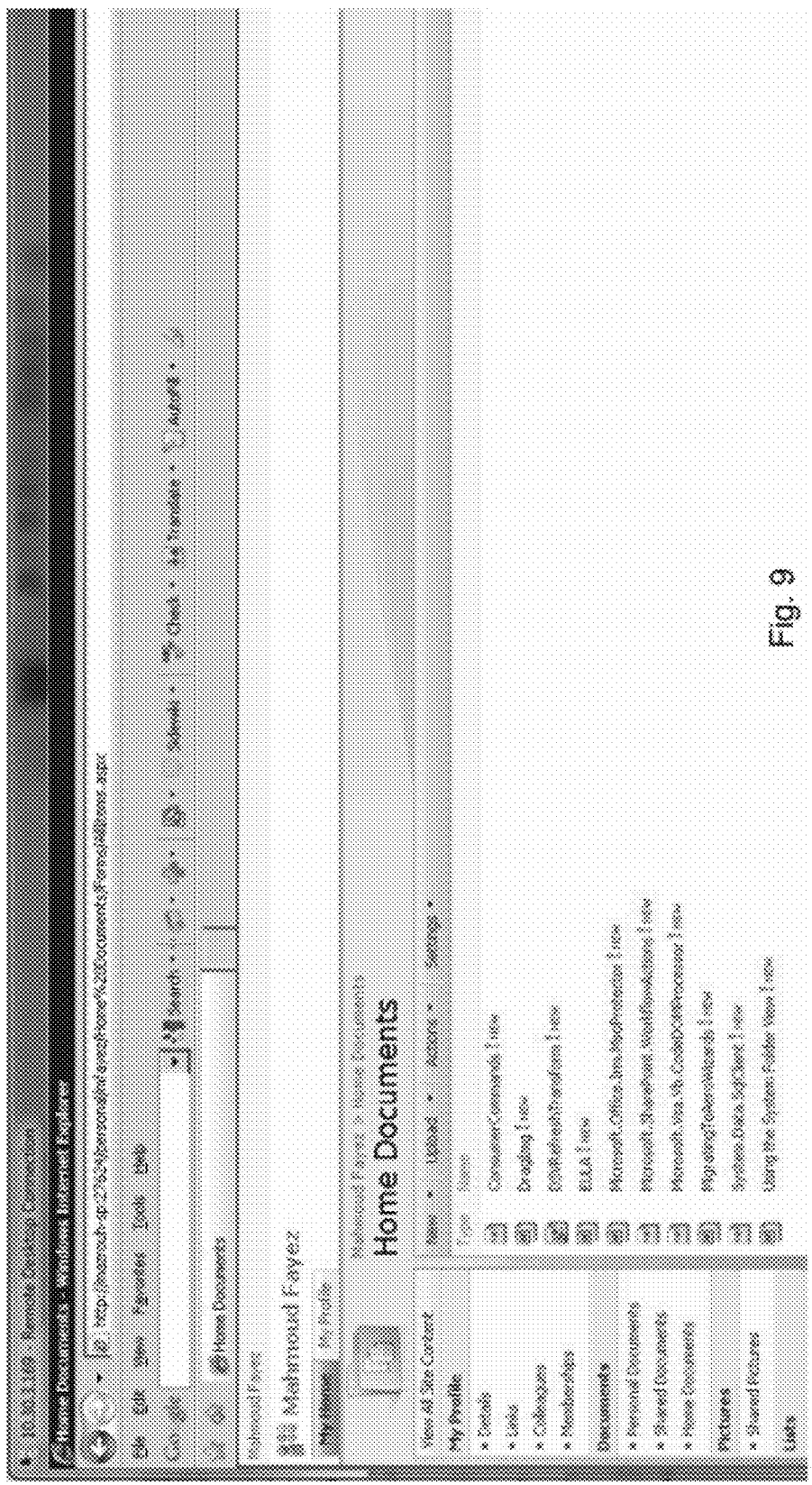

As shown in FIG. 8, the CSIU 30, e.g., accessed by a storage administrator via device 12, displays a dialog screen by which the user may select data files, e.g., by entering the source directory path of the end-user's home directory on the file server 14, along with that of the target SharePoint site 28. Clicking the "import" button causes the utility to perform the import by capturing and forwarding the corresponding metadata, while leaving the underlying data files in place at data store 14. After the import/in-place-migration is complete, the SharePoint site 28 contains "links" to each file imported, such as shown in FIG. 9.

Figure 10:
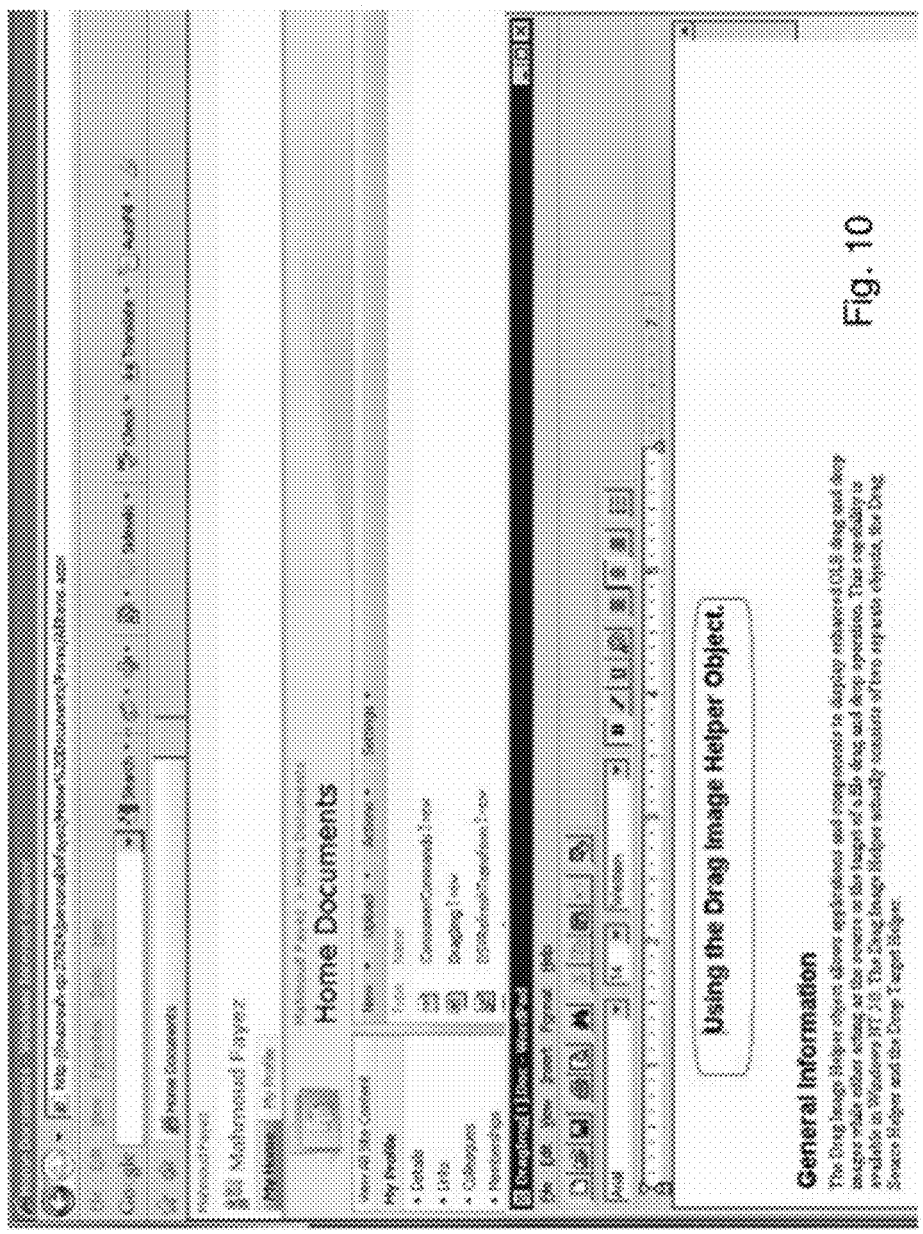

To illustrate the items in SharePoint 28 are simply "links" to the files on file server 14, the screenshot of FIG. 10 shows the contents of a "DragImg" Word document. This document was launched (e.g., by the end-user device 12') from the "link" in the user's Home Documents site on Sharepoint 28.

Figure 11:
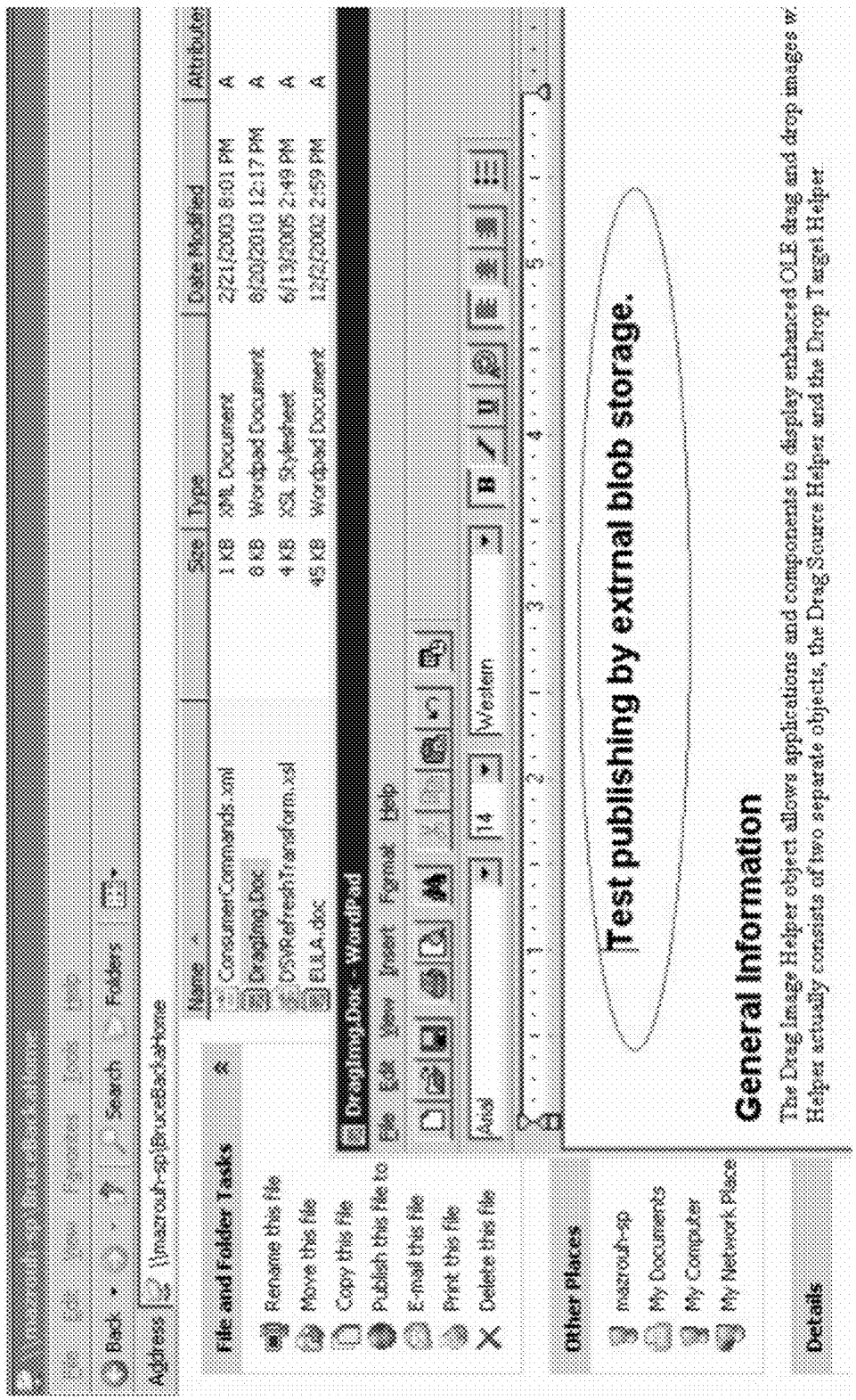

Thereafter, as shown in FIG. 11, the title of the DragImg document file is modified from the end-user's Home directory on the original file server 14 (i.e., not through SharePoint 28), and then stored back to the file server 14.

Figure 12:
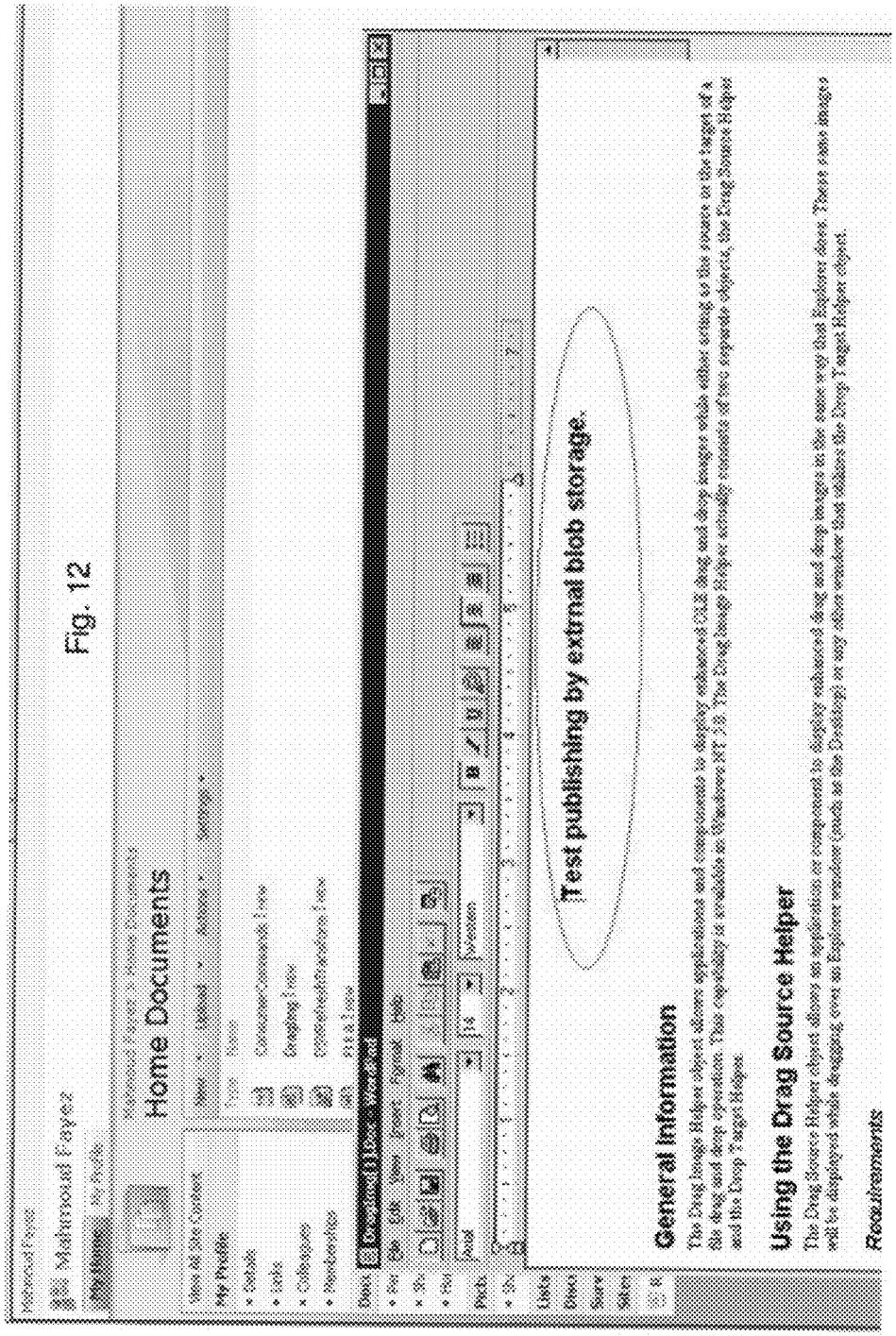

Then, the same file is opened through its "link" on SharePoint 28. As can be seen in FIG. 12, the title of this document shows the change made outside of Sharepoint 28. Thus, it can be seen that the contents of the file still resides on the original file server 14, not in the SharePoint database 28.

Figure 13:
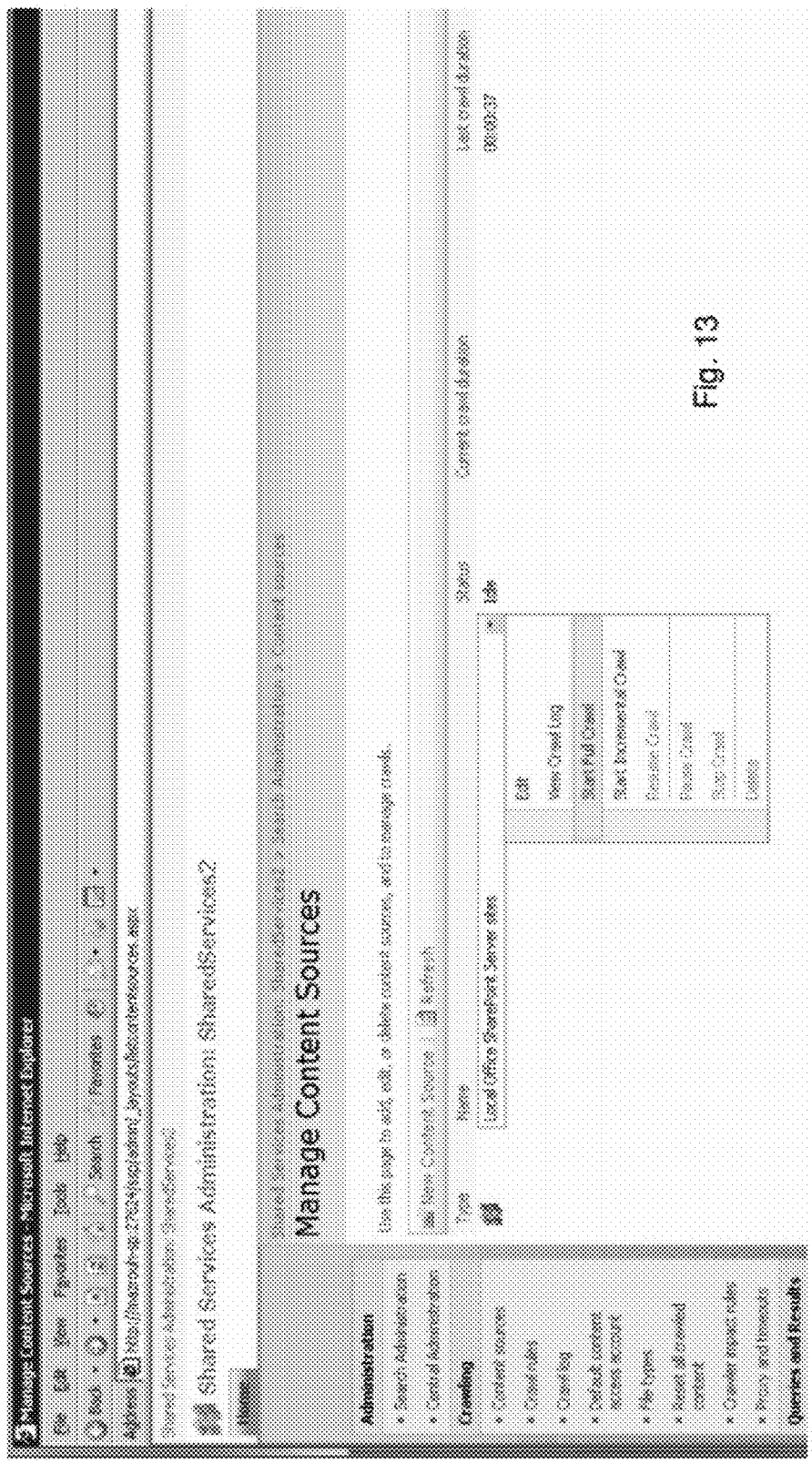

Turning now to FIG. 13, once they have been published or "migrated" as described herein, Sharepoint 28 may use its indexing service, e.g., as part of its external "Blob Storage" feature to index the files. This indexing service may be run on a schedule set by the storage administrator. Alternatively, the indexing process may be initiated manually using the "Start Full Crawl" feature as shown.

Figure 14:
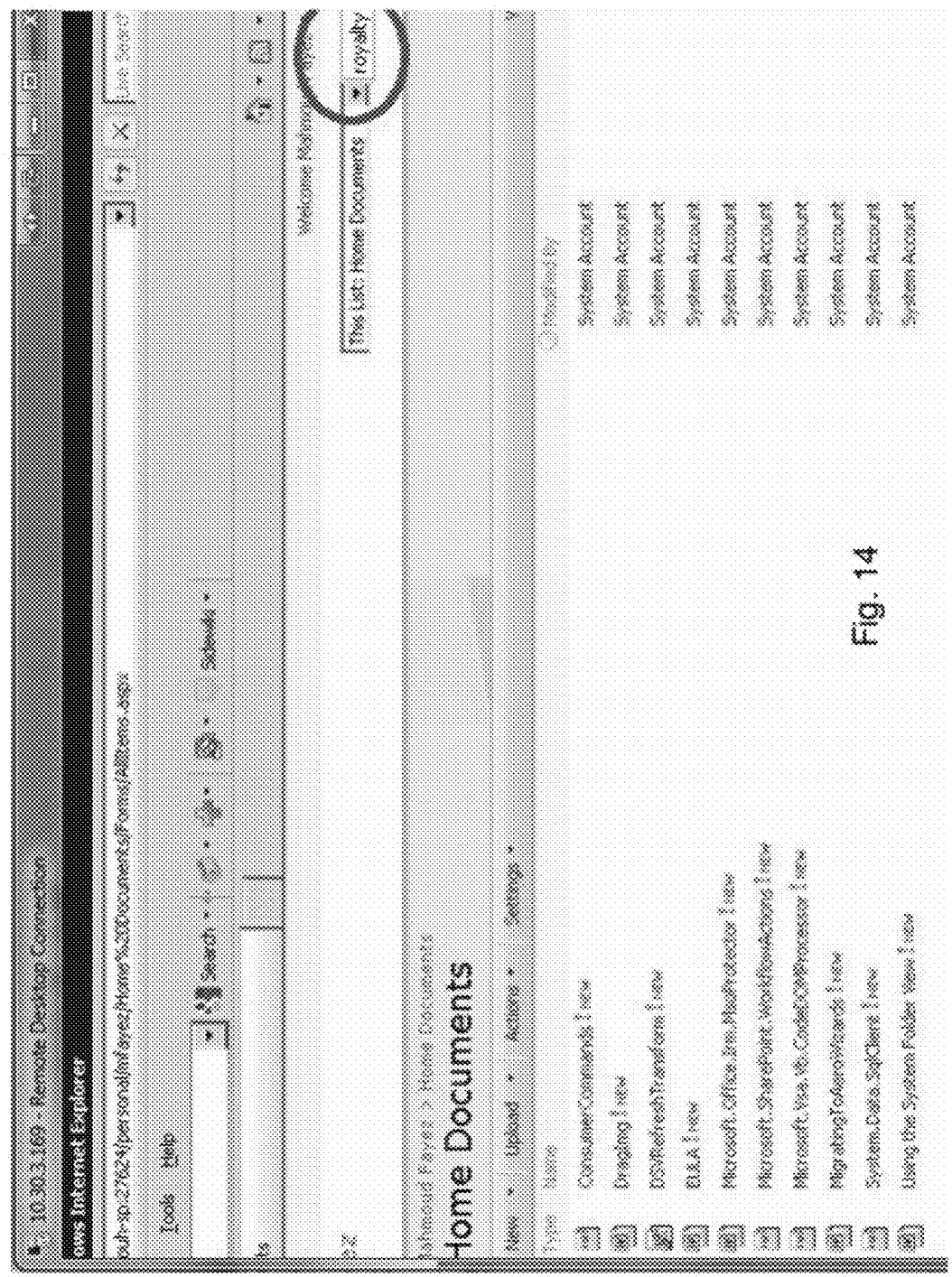
Figure 15:
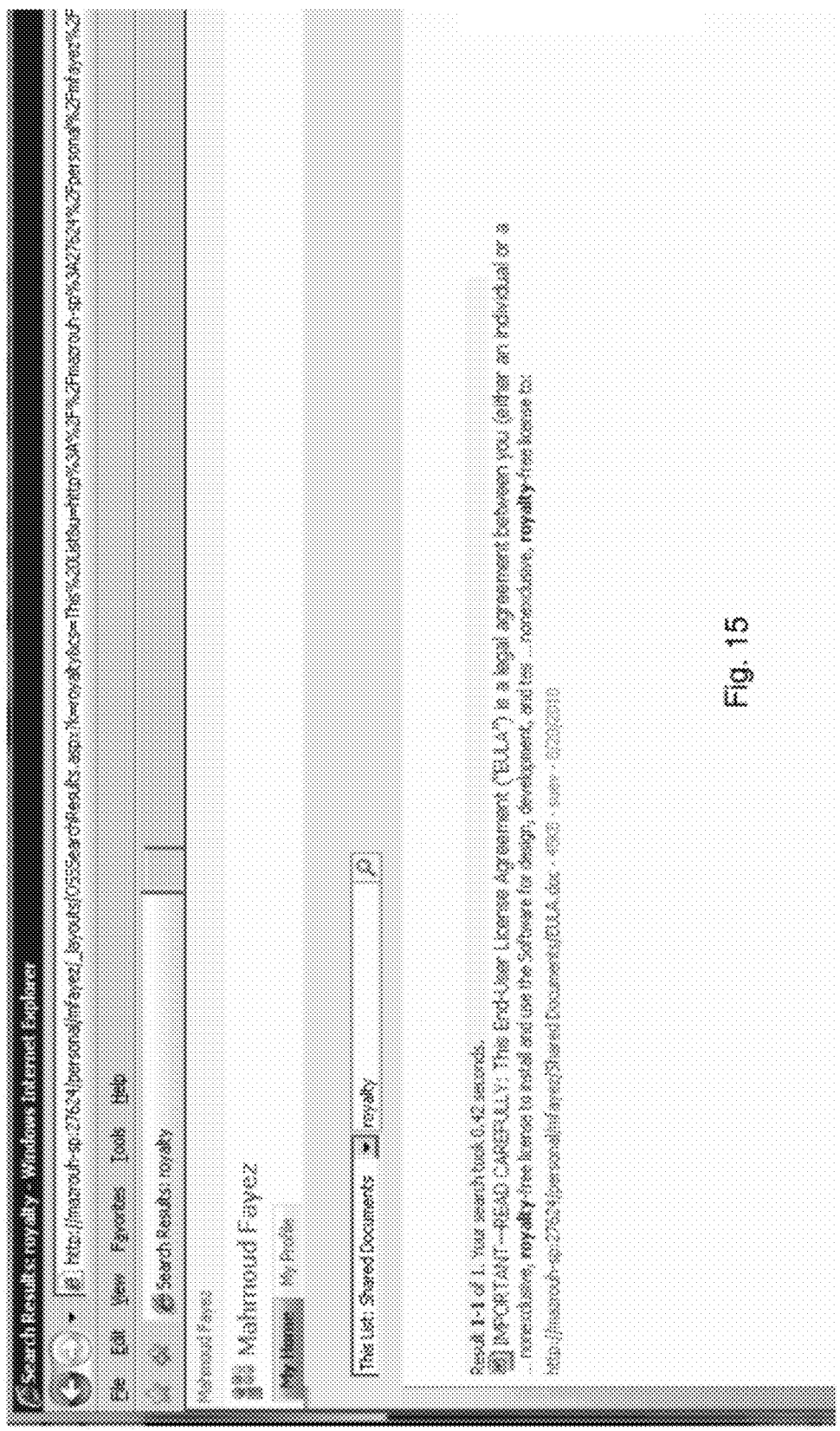

Turning to FIG. 14, the end-user may verify successful indexing by returning to his SharePoint home directory site 28 and perform a search for the word "royalty". As shown in FIG. 15, the search results indicate the search string was located in the EULA.doc file, illustrating successful indexing of the files imported using the in-place-migration of the present invention.

In this manner, the present invention can interface with and can be programmed to interface with essentially any archiving application that will allow it's command set/command interface to be made known to third parties for interfacing with that archiving application.

It should be recognized that information, e.g., commands, instructions, metadata, etc., may be passed between the various components (modules) disclosed herein by any convenient means, including conventional push or pull technology, without departing from the scope of the present invention. Moreover, modifications and substitutions by one of ordinary skill in the art are considered to be within the scope of the present invention, which is not to be limited except by any allowed claims and their legal equivalents.

What is claimed is:

1. A system for in-place-migration of data to a cloud-based data storage service, the system comprising:
    a Cloud Storage Import Utility (CSIU) device including a file selection module and a network server having a processor configured to host the CSIU device, and configured to generate a user interface at a client device;
    the user interface configured for allowing a user at the client device to select one or more files or file folders associated with a primary shared storage device connected directly to the network, to be published to a remote cloud-based storage service for use with the cloud-based storage service, and for providing an indication of said selection, the primary shared storage device being separate from the client device;
    the CSIU device being separate from the primary shared storage device and configured to capture metadata for the selected files or file folders;
    the CSIU device configured to provide one or more commands understandable by the cloud-based data storage service, to cause the metadata to be copied to the cloud-based data storage service independently of the one or more files or file folders, wherein the files or file folders are usable by the cloud-based storage service without any need to move the files or file folders to the cloud-based storage service;
    wherein the CSIU device is configured to enable the cloud-based storage service to index the files or file folders independently of any movement of the files or file folders to the cloud-based storage service; and
    wherein the CSIU device is configured to enable movement of the selected files or file folders from the primary storage device to another primary storage device remote from the cloud-based storage service, wherein the files or file folders at the other primary storage device are usable by the cloud-based storage service independently of any movement of the files or file folders to the cloud-based storage service.

2. The system of claim 1, wherein the CSIU device is configured to insert the metadata into a metadata database of the cloud-based storage service.

3. The system of claim 2, wherein the CSIU device is configured to generate an index of the selected files or file folders to permit content-based searching of the selected files or file folders.

4. The system of claim 3, wherein the CSIU device is configured to insert the index into the cloud-based storage service.

5. The system of claim 1, further comprising:
   a user request device being communicably couplable to the CSIU device; and
   said user request device configured to display the user interface to allow the user to select the one or more files or file folders associated with the primary storage device.

6. The system of claim 1, wherein said user interface is configured for providing the indication of said selection in the form of a listing of said one or more files or file folders associated with the primary storage device.

7. The system of claim 1, comprising the primary shared storage device.

8. The system of claim 7, wherein the primary shared storage device comprises a Network Attached Storage (NAS) device.

9. The system of claim 7, wherein the primary shared storage device comprises a Storage Area Network (SAN) device.

10. The system of claim 7, wherein the primary shared storage device comprises a direct attached storage (DAS) device.

11. The system of claim 1, wherein the processor is specifically configured to enable the CSIU to generate the user interface, capture metadata for the selected files or file folders, and provide the one or more commands understandable by the cloud-based data storage service.

12. A method for enabling in-place-migration of data to a cloud-based data storage service, the method comprising:
   (a) configuring a network server-hosted Cloud Storage Import Utility (CSIU) device to include a file selection module and to generate a user interface at a client device;
   (b) configuring the user interface to allow a user at the client device to select one or more files or file folders associated with a primary shared storage device connected directly to the network, to be published to a remote cloud-based storage service for use with the cloud-based storage service, and for providing an indication of said selection, the primary shared storage device being separate from the client device;
   (c) configuring the CSIU device, which is separate from the primary shared storage device, to capture metadata for the selected files or file folders;
   (d) configuring the CSIU device to provide one or more commands understandable by the cloud-based data storage service, to cause the metadata to be copied to the cloud-based data storage service independently of the one or more files or file folders, wherein the files or file folders are usable by the cloud-based storage service without first being moved to the cloud-based storage service;
   (e) configuring the CSIU device to enable the cloud-based storage service to index the files or file folders independently of any movement of the files or file folders to the cloud-based storage service; and
   (f) configuring the CSIU device to enable movement of the selected files or file folders from the primary storage device to another primary storage device remote from the cloud-based storage service, wherein the files or file folders at the other primary storage device are usable by the cloud-based storage service independently of any movement of the files or file folders to the cloud-based storage service.

13. The method of claim 12, comprising configuring the CSIU device for being couplable to the primary storage device and the cloud-based storage service.

14. The method of claim 13, further comprising configuring the indication to include a listing of the one or more files or file folders selected by the user.

15. A method for in-place-migration of data to a cloud-based data storage service, the method comprising:
   (a) communicably coupling a user request client device to a primary shared storage device connected directly to a network, and to a network server-hosted Cloud Storage Import Utility (CSIU), the CSIU including a file selection module and being configured to generate a user interface at the client device, the primary shared storage device being separate from the client device, and the CSUI being separate from the primary shared storage device;
   (b) selecting, with the user interface at the client device, one or more files or file folders associated with the primary shared storage device to be published to the cloud-based storage service for use with the cloud-based storage service, and for providing an indication of said selection;
   (c) capturing, with the CSIU, metadata for the selected files or file folders;
   (d) providing, with the CSIU, one or more commands understandable by the cloud-based data storage service, to cause the metadata to be copied to the cloud-based data storage service independently of the one or more files or file folders, wherein the files or file folders are usable by the cloud-based storage service without first being moved to the cloud-based storage service;
   (e) enabling, with the CSIU, the cloud-based storage service to index the files or file folders independently of any movement of the files or file folders to the cloud-based storage service; and
   (f) moving, with the CSIU, the selected files or file folders from the primary storage device to another primary storage device remote from the cloud-based storage service, wherein the files or file folders at the other primary storage device are usable by the cloud-based storage service independently of any movement of the files or file folders to the cloud-based storage service.

16. The method of claim 15, further comprising communicably coupling the CSIU to the primary storage device including at least one of a Network Attached Storage (NAS) device, a Storage Area Network (SAN) device, and a direct attached storage (DAS) device.

* * * * *